(12) United States Patent
Zeyfang et al.

(10) Patent No.: US 8,800,603 B2
(45) Date of Patent: Aug. 12, 2014

(54) FLANGE PROTECTOR AND MASKING DEVICE

(75) Inventors: Frederick W. Zeyfang, Erie, PA (US); William H. Sardini, Erie, PA (US)

(73) Assignee: Protective Industries, Inc., Buffalo, NY (US)

( * ) Notice: Subject to any disclaimer, the term of this patent is extended or adjusted under 35 U.S.C. 154(b) by 118 days.

(21) Appl. No.: 13/374,185

(22) Filed: Dec. 15, 2011

(65) Prior Publication Data
US 2013/0153079 A1 Jun. 20, 2013

(51) Int. Cl.
*B65D 59/06* (2006.01)

(52) U.S. Cl.
USPC .......................................... 138/96 R; 138/89

(58) Field of Classification Search
USPC ........................................ 138/89, 96 R, 96 T
See application file for complete search history.

(56) References Cited

U.S. PATENT DOCUMENTS

| | | | |
|---|---|---|---|
| 1,903,220 A | 3/1933 | Lemert | |
| 1,912,312 A | 5/1933 | Schacht | |
| 3,379,327 A | 4/1968 | Link et al. | |
| 3,463,196 A | 8/1969 | Richardson | |
| 3,621,623 A | 11/1971 | Downes | |
| 3,780,773 A | 12/1973 | Haugen | |
| 3,856,050 A * | 12/1974 | Rooney | 138/96 R |
| 3,942,681 A * | 3/1976 | Richardson | 220/324 |
| 3,996,966 A | 12/1976 | Princell | |
| 4,014,368 A * | 3/1977 | Nelsen | 138/109 |
| 4,269,232 A * | 5/1981 | Witschi | 138/96 R |
| 4,423,753 A * | 1/1984 | Smith et al. | 138/89 |
| 4,799,716 A * | 1/1989 | Kujawa et al. | 285/334.2 |
| 4,915,137 A * | 4/1990 | Hall et al. | 138/96 R |
| 4,973,387 A * | 11/1990 | Osterman et al. | 203/39 |
| 5,265,752 A | 11/1993 | Olson | |
| 5,435,350 A | 7/1995 | Bowes | |
| 5,496,141 A | 3/1996 | Popsys | |
| 5,503,189 A * | 4/1996 | Lamendola | 138/96 R |
| 5,546,989 A | 8/1996 | Bowes | |
| 5,622,208 A | 4/1997 | Vinson | |
| D412,970 S | 8/1999 | Whyte | |
| D430,652 S | 9/2000 | Toit et al. | |
| 6,332,478 B1 | 12/2001 | Holden et al. | |
| 6,532,992 B1 * | 3/2003 | Holden | 138/96 R |
| D475,925 S | 6/2003 | Sturk | |
| 2008/0142108 A1 | 6/2008 | Baker et al. | |
| 2010/0212765 A1* | 8/2010 | Baker et al. | 138/89 |

OTHER PUBLICATIONS

Caplugs Self-Adhesive Die Cut Flange Frotectors Full Face http://www.caplugs.com/productdetails.aspx?id=1000015&itemno=FAF+SERIES sold since at least as early as 1990.

(Continued)

*Primary Examiner* — Patrick F Brinson
(74) *Attorney, Agent, or Firm* — Hodgson Russ LLP

(57) ABSTRACT

A flange protector is provided for a raised face of a flange comprising a flexible impact-resistant material having a cover portion, the raised surface defined by a circumferential raised shoulder portion extending from a surface of the flange, the cover portion having such dimension and configured to cover in protective relationship the raised surface of a flange, the flange protector extending across the raised surface and having a skirt portion which extends downwardly in encompassing relationship to the shoulder portion from the flange surface, the skirt portion contacting the raised shoulder portion at a single point of contact.

64 Claims, 8 Drawing Sheets

(56) References Cited

OTHER PUBLICATIONS

Caplugs die-cut flange protector with bolt holes http://www.caplugs.com/productdetails.aspx?id=1000015&itemno=FAN+SERIES sold since at least as early as 1970.
Caplugs Stud Hole Flange Protector http://www.caplugs.com/productdetails.aspx?id=1000015&itemno=FC+SERIES sold since at least as early as 1976.
Caplugs Self-adhesive raised race flange protector http://www.caplugs.com/productdetails.aspx?id=1000015&itemno=FAR+SERIES sold since at least as early as 1990.
Caplugs Valve Flange protectors http://www.caplugs.com/productdetails.aspx?id=1000015&itemno=VALVE+FLANGE+SERIES since at least 1990.
Caplugs Push-in Flange Protectors http://www.caplugs.com/productdetails.aspx?id=1000015&itemno=EPN+305+SERIES sold at least as early as 1990.
Caplugs Outside Fitting Flange Protectors http://www.caplugs.com/productdetails.aspx?id=1000015&itemno=EPN+310+SERIES+PIPE sold since at least as early as 1990.
Caplugs Vinyl American Standard Flange Protectors http://www.caplugs.com/productdetails.aspx?id=1000002&itemno=VAS+SERIES sold since at least as early as 1990.
Caplugs Vinyl Flange Protectors http://www.caplugs.com/productdetails.aspx?id=1000007&itemno=VF+SERIES sold since at least as early as 1990.
Caplugs Vinyl Snap Ring Flange Covers http://www.caplugs.com/productdetails.aspx?id=1000002&itemno=VSR+SERIES sold since at least as early as 1990.

* cited by examiner

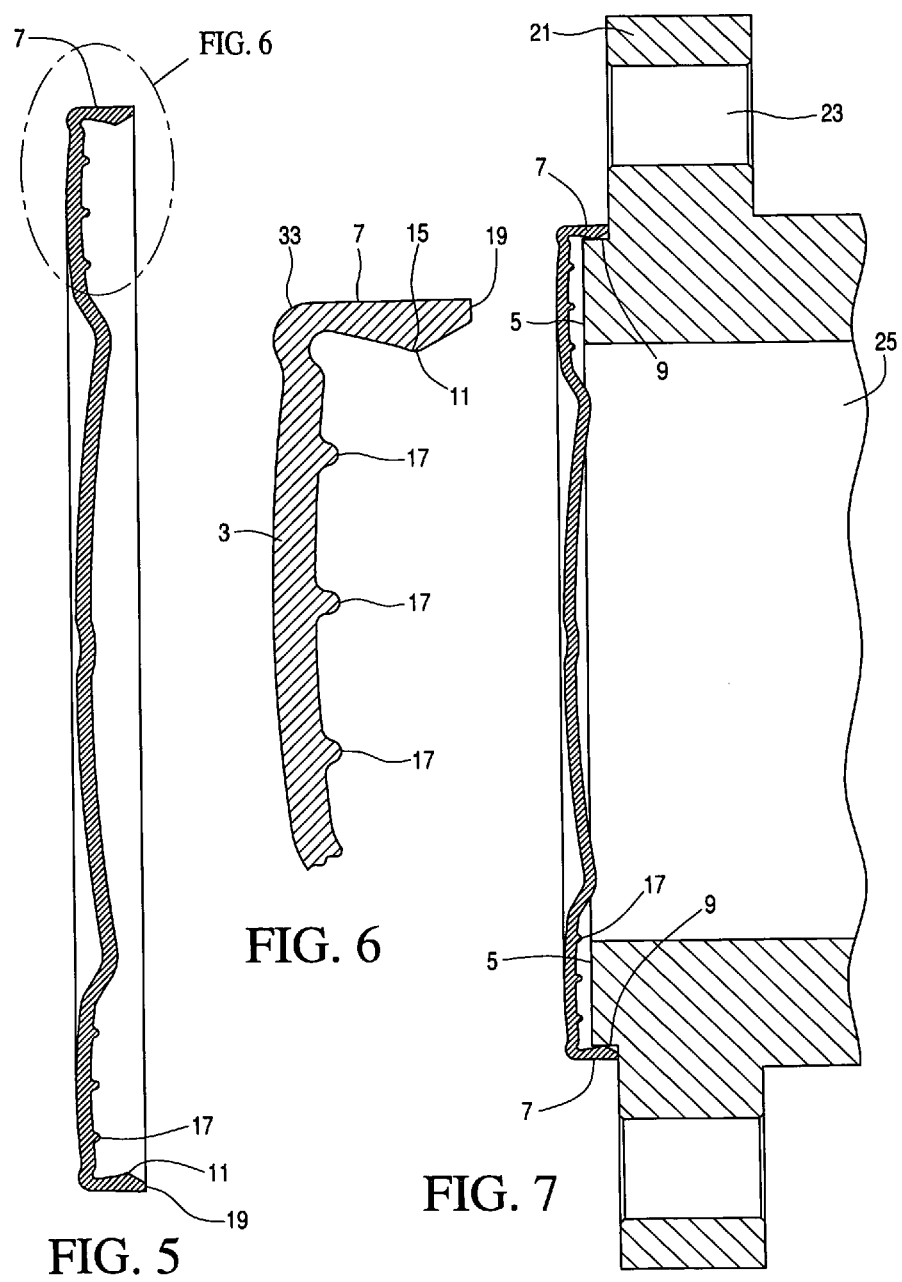

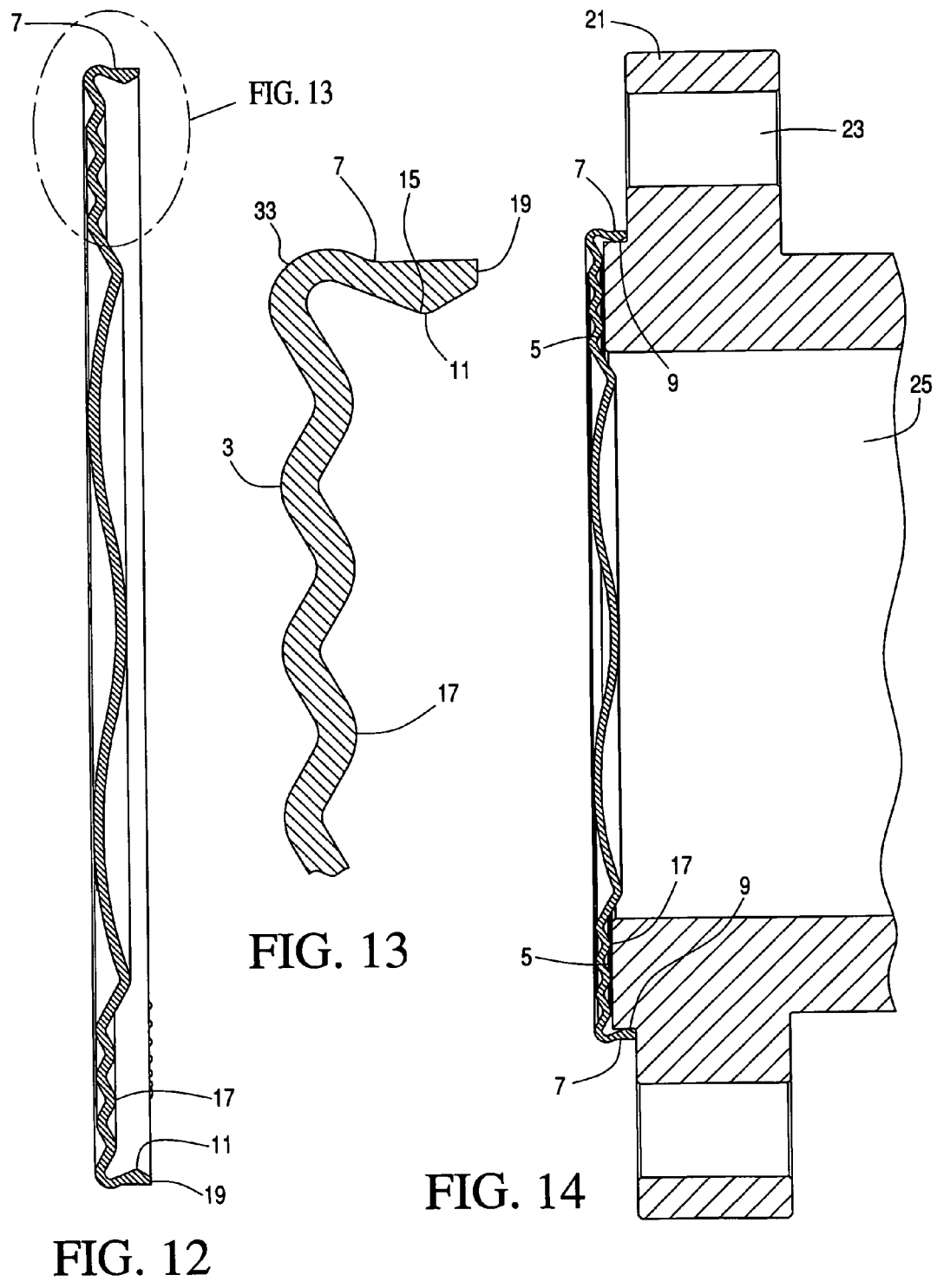

FLANGE PROTECTOR AND MASKING DEVICE

BACKGROUND OF THE PRESENT INVENTION

The present invention is directed to a flange protector and masking device for use with a flange which may be used, for instance, for making connections to pipes, valves, etc. Such flanges have bolt holes adapted to receive bolts for making such connections to a mating flange having corresponding bolt holes.

The flange face surface will typically be finely machined to ensure a tight seal between the mating flange surfaces and an intervening sealing gasket that is compressed between the opposing flange surfaces when connected together with bolts via the bolt holes in the opposing flanges. As operating pressures in the piping systems where flanges are used can exceed 2,500 PSI, any type of damage to the flange sealing surface (nicks, scratches, dings, etc.) can create significant maintenance and safety issues. The use of a flange protector during storage, shipment, etc. is thus found useful to protect the flange face surface as a cost avoidance to expensive field repairs and/or replacement.

It is also desirable to mask the raised flange surface when painting or otherwise preparing the surface of the flange. A device to accomplish such a result is deemed very useful in the industry.

A number of flange protector designs are known. See, for instance, U.S. Pat. Nos. 1,903,220; 2,708,453; 3,563,277; 3,856,050; 3,942,681; 4,014,368; 4,233,697; 4,423,753; 4,915,137; 5,265,752; 5,503,189; 5,435,350; 5,546,989; 6,332,478; and 6,532,992.

A number of products are commercially available, including self-adhesive die-cut raised face protectors, push-in flange protectors which engage the central bore of the flange and cover the entire flange, lid-like flange covers which snap into place over the entire flange in locking engagement with the flange rim, die-cut flange covers which may be bolted into place onto the flange by means of holes in the flange cover, and flange protectors which have lugs which fit into the bolt holes of the flange to hold the flange cover into place.

While generally satisfactory, such designs are in need of improvement. For instance, it is at times difficult to install the flange protector, particularly when the flange protector has lugs which must be seated within bolt holes spaced about the periphery of a flange to be protected. Depending upon the flexibility of the flange protector body, it may be difficult to engage a number of lugs within multiple bolt holes at the same time.

The use of adhesives may be less than effective due to the potential effect of the environment during storage and transport. The use of bolts to attach the die-cut flange protector is labor intensive from the standpoint of attachment and removal. The use of whole-flange covers requires the use of a multitude of sizes, and such covers are ineffective as masking devices.

Additionally, injection molded designs typically contain molded-in stresses, and warping frequently prevents the protector from laying flat against the raised sealing face of the valve or flange. This condition creates gaps between the protector and the raised face making the surface more prone to damage, and additionally making installation and removal more difficult.

It may also be difficult to remove the flange protector once installed on the flange when lugs are used, as the flange protector is maintained in place by the action of multiple lugs which are each snugly fit within a bolt hole. The removal of the lugs is made more difficult due to the fact that a number of lugs must be removed at the same time, as well as the fact that the lugs must each be lifted from the bolt holes in the direction of the longitudinal axis of the bolt holes in order to be removed. Such removal is also made difficult by the fact that the flange protector is relatively inflexible, since the material employed must be impact-resistant in order to provide adequate protection. The fact that the bolt holes are spaced differently for different types of flanges also necessitates the use of flange covers of differing dimensions having lugs spaced differently to accommodate different bolt hole spacing.

It is, however, recognized that, irrespective of the spacing of the bolt holes, the diameter of the flange face does not differ for a particular class of flange irrespective of the diameter of the flange itself, and the differing spacing dimensions for the bolt holes. This provides an advantage in that the protection of the flange face itself may be focused upon while ignoring the varied bolt hole spacings if the flange protector can be attached to the flange without resorting to use of the bolt holes as anchoring means.

It is accordingly an object of the present invention to provide a flange protector and masking device suitable for protective engagement with the raised face of a flange, which flange protector and masking device may both be easily installed on the raised face of the flange, as well as easily removed yet reusable, while still providing satisfactory protection for the raised face of the flange during storage and/or transport, without resort to the use of bolt holes as an anchoring mechanism.

The retention feature of the flange protector and masking device of the present invention additionally is quite different from other prior art used where the protector skirt is used for both protection of the raised face and also retention through an interference fit (hoop stress) along the outside skirt of the protector.

Finally, the present invention provides significant cost advantages over other prior art because of the elegance of the design, simplified tooling, low cost tooling for plastic injection molding, and material usage only where absolutely needed for raised face protection. Other designs require full flange coverage, or coverage beyond the raised face area for retention and/or the use of multiple components for attachment and securing the protector to the flange.

Yet another advantage of the present invention is that the protector can additionally be used as a masking device to mask off the raised flange face during sand blasting, painting, and or plating of the valve or fitting.

SUMMARY OF THE INVENTION

The present invention is directed to a reusable flange protector comprising a flexible impact-resistant material having a cover portion suitable for protective covering of a raised face surface of a flange.

The flange protector comprises a flexible impact-resistant material, which functions well in weather extremes, having a cover portion to cover a raised face of a flange, with the raised face surface defined by a circumferential shoulder portion extending from a surface of the flange, the cover portion having such dimension and configured to cover in protective relationship the raised face surface of the flange, the flange protector extending across the raised face surface and having a skirt portion at a periphery thereof which extends from the cover portion in encompassing relationship to the shoulder portion. Preferably, a surface of the skirt opposing the shoulder portion when in encompassing relationship thereto has at least one protrusion extending therefrom serving to space the skirt from the shoulder portion.

Advantageously, finger tabs are also provided which, in one embodiment, may include holes which may be used to tie the flange protector to the flange using the bolt holes of the flange.

In another embodiment, there is provided in combination, the flange protector of the present invention and a flange, with the flange protector being in protective relationship with the raised surface of the flange.

BRIEF DESCRIPTION OF THE DRAWINGS

FIG. 5 is a cross-sectional view of an embodiment of the flange protector of the present invention.

FIG. 6 is a cross-sectional view of an edge portion of the flange protector of FIG. 5.

FIG. 7 is a cross-sectional view of the flange protector of FIG. 5 in protective relationship to a flange surface.

FIG. 12 is a cross-sectional view of the flange protector of FIG. 8.

FIG. 13 is a cross-sectional view of an edge portion of the flange protector of FIG. 12.

FIG. 14 is a cross-sectional view of the flange protector of FIG. 12 installed on a flange.

DETAILED DESCRIPTION OF THE INVENTION

Figure 1:
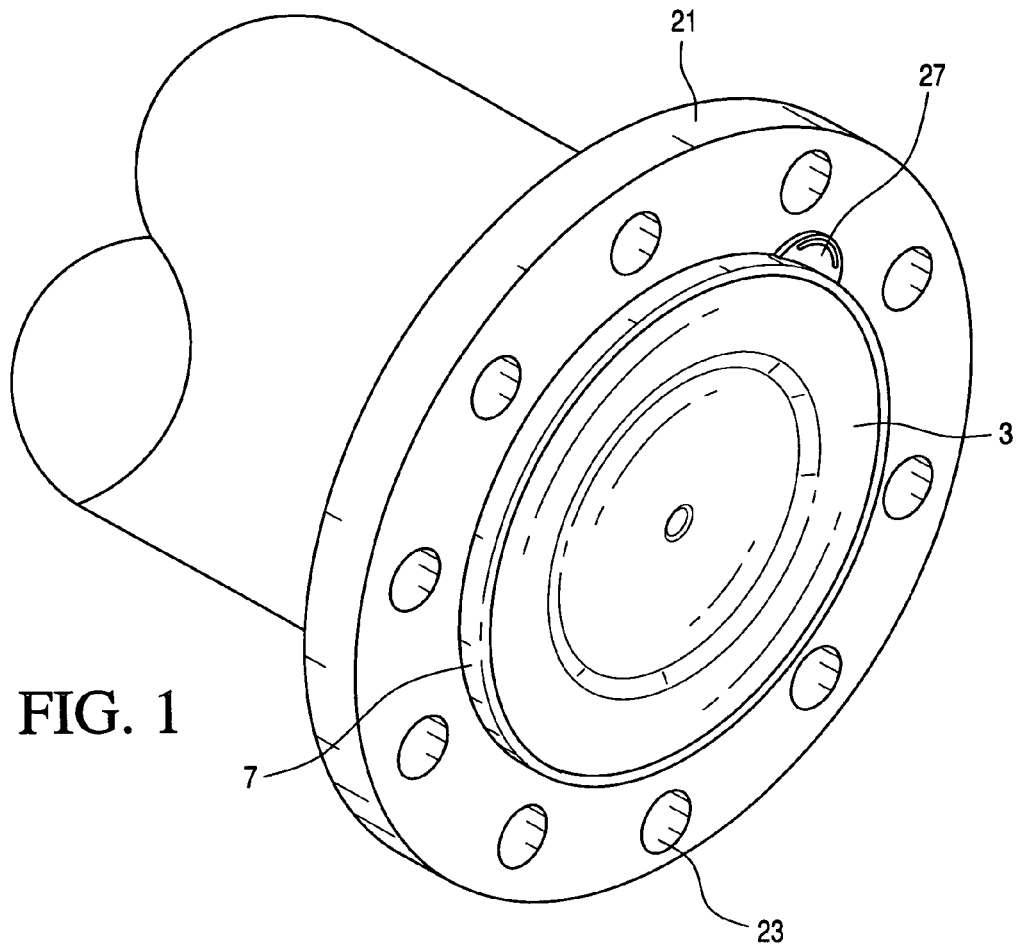
FIG. 1 is a view in perspective from the top of an embodiment of the flange protector of the present invention installed on a flange.
Figure 2:
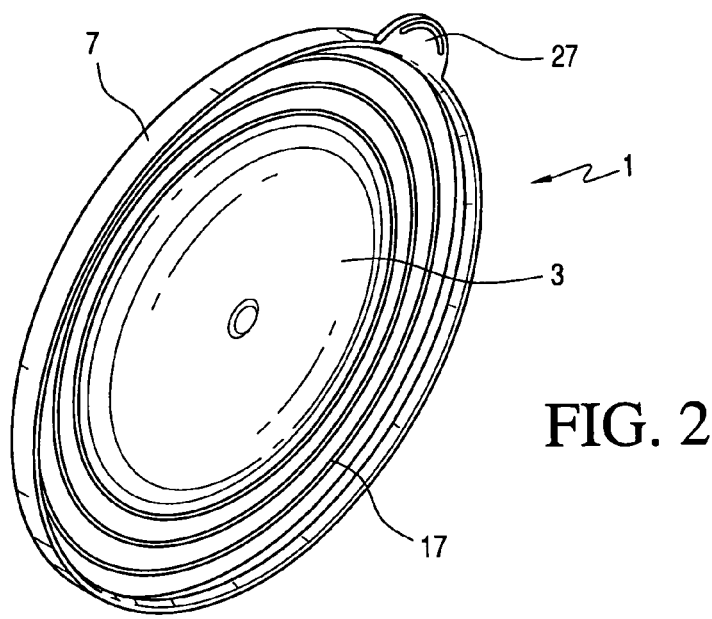
FIG. 2 is a view in perspective from the bottom of the flange protector of the present invention of FIG. 1.
Figure 3:
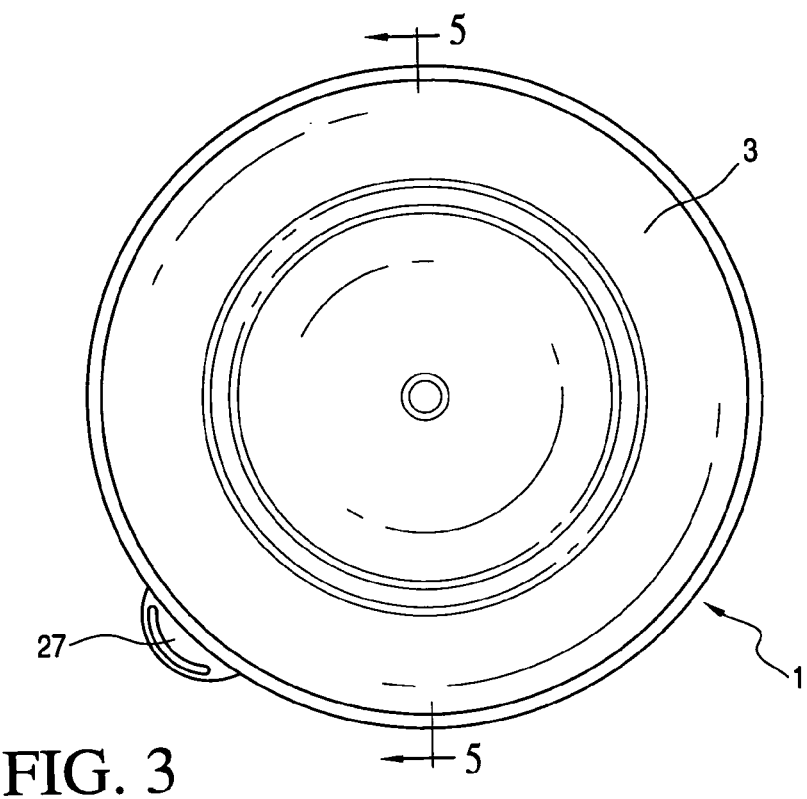
FIG. 3 is a top view of the flange protector of FIG. 1.
Figure 4:
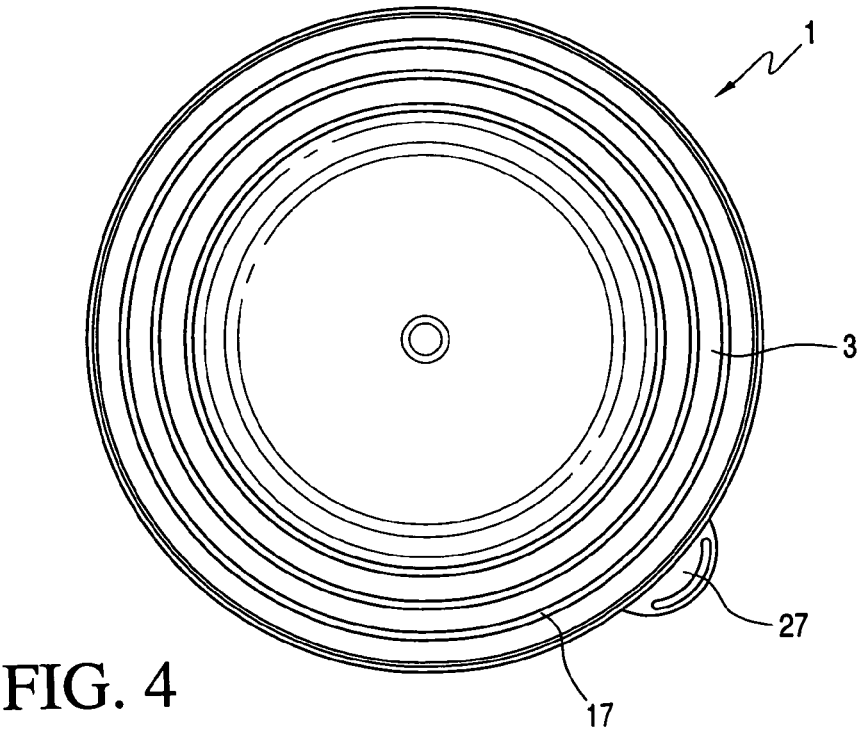
FIG. 4 is a bottom view of the flange protector of FIG. 1.
Figure 8:
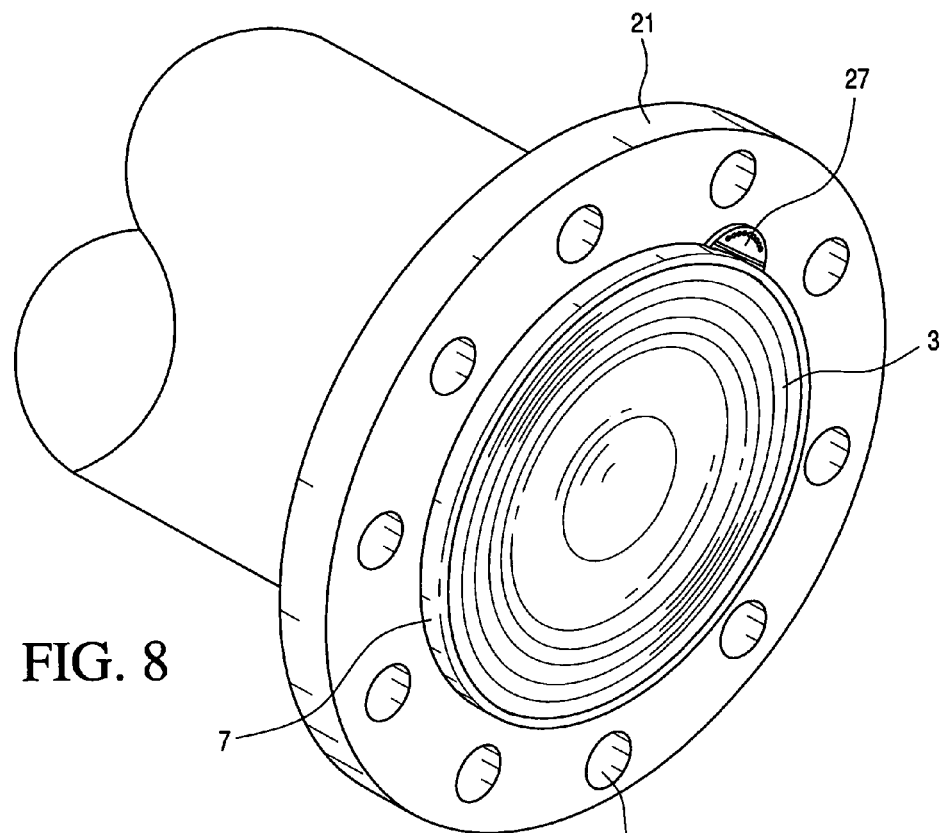
FIG. 8 is a view in perspective from the top of another embodiment of the flange protector of the present invention installed on a flange.
Figure 9:
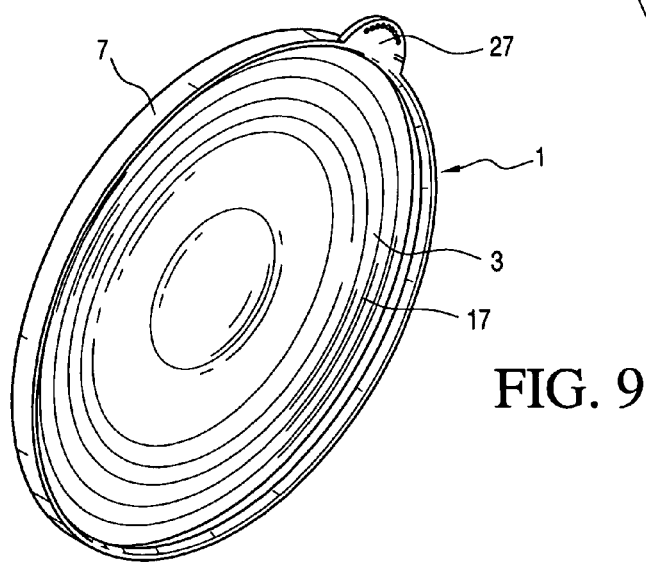
FIG. 9 is a view in perspective from the bottom of the flange protector of FIG. 8.
Figure 10:
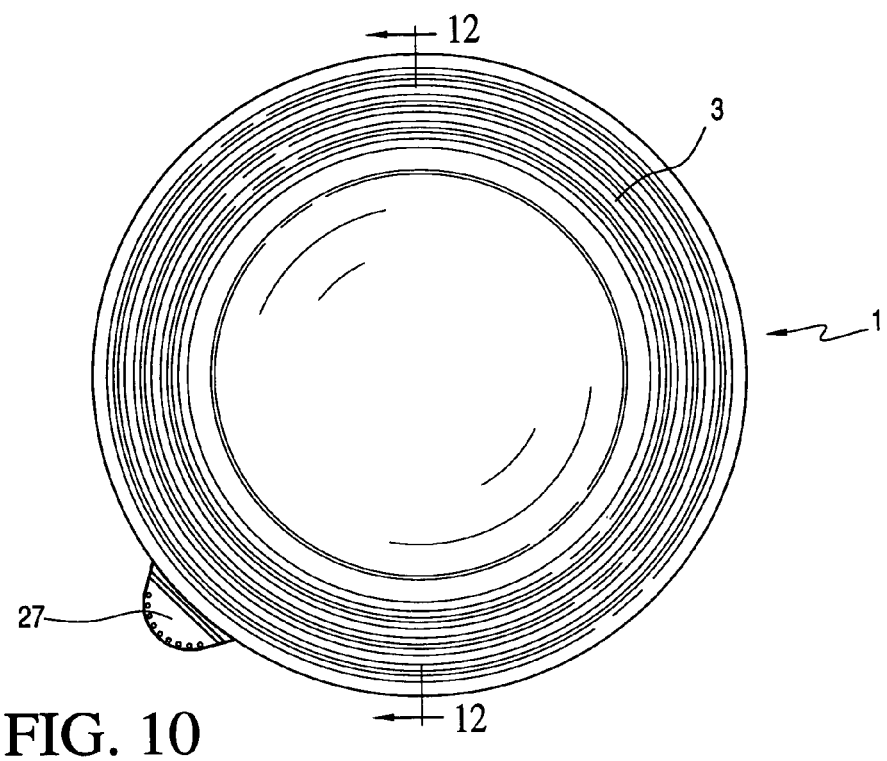
FIG. 10 is a top view of the flange protector of FIG. 8.
Figure 11:
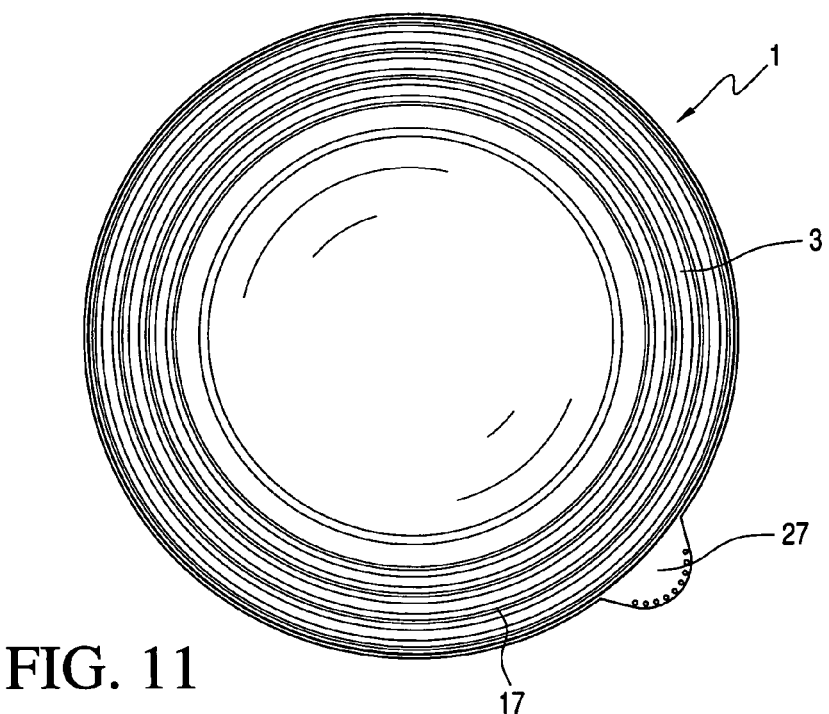
FIG. 11 is a bottom view of the flange protector of FIG. 8.

The flange protector of the present invention will be described in connection with FIGS. 1-18.

The flange protector 1 of the present invention comprises a generally planar cover 3 having the configuration of a flange facing surface 5 to be protected, and including a skirt portion 7 extending from a circumferential edge thereof and configured to engage a shoulder portion 9 of the flange 21 which defines the circumferential extent of the raised flange face 1. The cover portion 3 of the flange protector will correspond to the configuration of the raised flange face 5 to ensure full protection, and will accordingly generally be circular in configuration, as this is generally the configuration of the flange surface to be protected.

The skirt portion 7 extends from the periphery of the cover portion 3 and is of such length as to extend along at least a portion of the shoulder portion 9 to maintain the cover portion 3 in registry with the face of the flange.

While the skirt portion 7 preferably extends about the entire periphery of the shoulder portion 9 as shown in the Figures, it is only necessary for the peripheral extent of the shoulder portion to be sufficient to engage the shoulder portion in a manner that maintains the flange protector in protective relationship with the face of the flange. That is, if the thickness of the skirt wall has sufficient thickness, the skirt may be comprised of interrupted spaced sections which may be separated, for instance, by a slit portion. For purposes of maximizing the retention forces necessary to maintain the flange protector in place, as well as to provide maximum masking, it is preferred that the skirt be comprised of a continuous circumferential portion.

In order to assist the placement of the flange protector 1 about the facing surface 5 of the flange 21, it is desirable for the inner surface of the skirt to include at least one protrusion 11 which serves to space the skirt 7 from the periphery of flange face shoulder portion 9. The at least one protrusion 11 may comprise one or more circumferential ribs or raised portions on the inner surface of the skirt, preferably spaced from the end of the skirt. The at least one protrusion 11 may be continuous but may also comprise disconnected raised portions spaced about the inner surface of the flange protector. However, it is desirable for the at least one protrusion to extend about the entire periphery of the skirt as depicted, as this serves to protect the flange face from the effect of the environment.

The at least one protrusion 11 on the skirt may take many forms. For instance, the protrusion may be defined by a radius 15 which engages the side of the shoulder 9, which is the preferred configuration as this assists in urging the skirt about the shoulder of the flange. However, the protrusion may also be more square-shaped, or pointed.

The cover portion 3 of the flange protector desirably includes at least one protrusion 17 on an inner surface thereof opposing the raised flange face which serves to space the inner surface of the cover portion from the raised flange face 5. Such protrusion 17 preferably extends about the entire circumference of a portion of the flange cover adjacent the raised face of the flange. However, spaced apart protrusions along the same radius may also be used with advantage to provide the desired spacing. Such protrusions serve to both protect the surface of the raised flange face, as well as provide dimensional stability to the cover portion of the flange protector to, for example, inhibit warping of the cover. Preferably, multiple continuous protrusions are employed each of which is in a different radius as shown in FIGS. 2, 4, 9, 11, 16 and 18.

The cover portion may take many forms in this regard. For instance, the cover portion may have a generally flat upper surface, with protrusions extending from the bottom surface of the cover portion adjacent the raised flange surface. Alternatively, portions of the cover portion may have a wavy configuration such that portions of both the top and bottom surfaces have such configuration. Such configurations are depicted in the Figures.

The bottom terminus 19 of the skirt is preferably of such length to abut the flange when the flange protector is fully inserted over the raised flange face in protective relationship thereto. The terminus may be of any suitable configuration, such that bottom edge of the skirt may be formed by a flat edge, a round edge, etc. The particular configuration is not critical to practice of the invention.

The flange protector may be installed by being pushed over the flange face into cooperative engagement with the circumferential shoulder portion of the flange.

To assist in removal of the flange protector, one or more tabs or finger grips 27, 29 may be usefully provided at a suitable location on the periphery of the skirt, whereby gripping and pulling on the tab or finger grip 27, 29 will result in removal of the flange protector from engagement with the flange. The tab or finger grip may be of any suitable configuration. For instance, as shown in the Figures, the tab or finger grip may be substantially semi-circular in configuration. Of course, the tab may be rectangular in configuration, more elongated, or of varying width. The finger grip(s) extend laterally from the skirt of the flange protector for ease of gripping. The finger grip(s) may extend from the bottom edge of the skirt (FIGS. 1-4 and 8-11), or from a position intermediate the top and bottom edges of the skirt, or from the top of the flange cover (FIGS. 15-18). If the flange protector is also to serve as a masking device during painting of the flange, the placement of the finger grip(s) at a position spaced from the bottom of the skirt (such as at the top as shown in FIGS. 15-18) avoids the finger grip(s) from interfering with the painting of the flange.

Figures 15, 16:
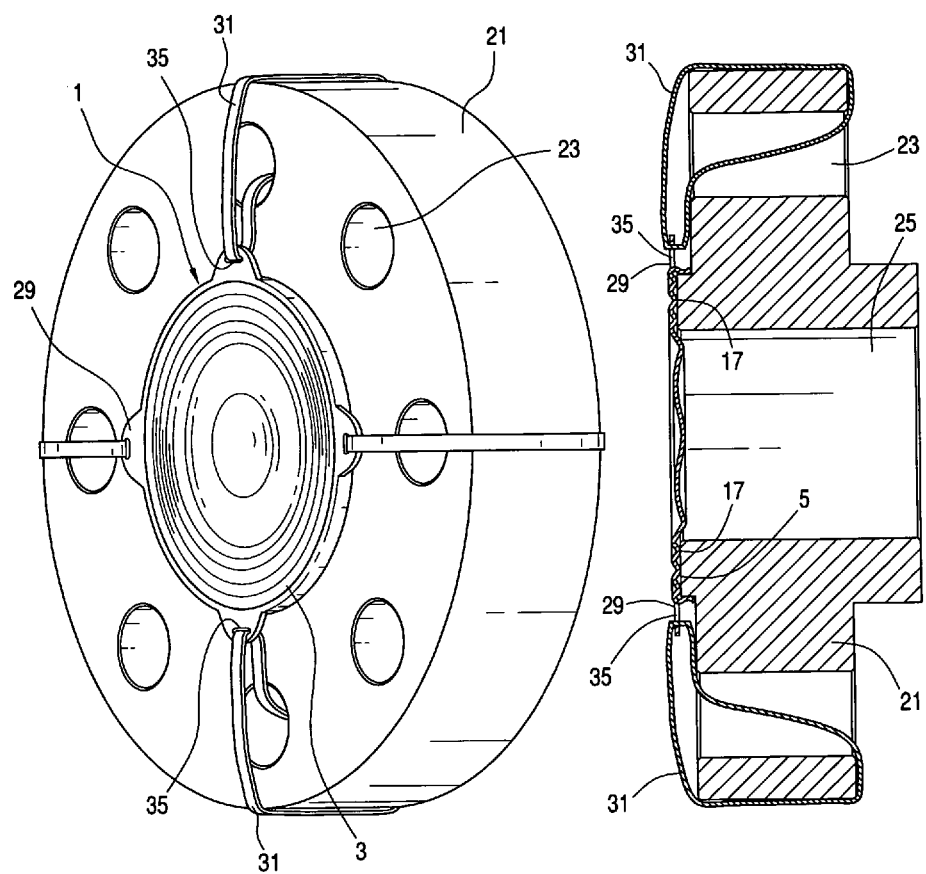
FIG. 15 is a top perspective view of another embodiment of the flange protector of the present invention installed on a flange.
FIG. 16 is a cross-sectional view of the flange protector of FIG. 15 installed on a flange.
Figures 17, 18:
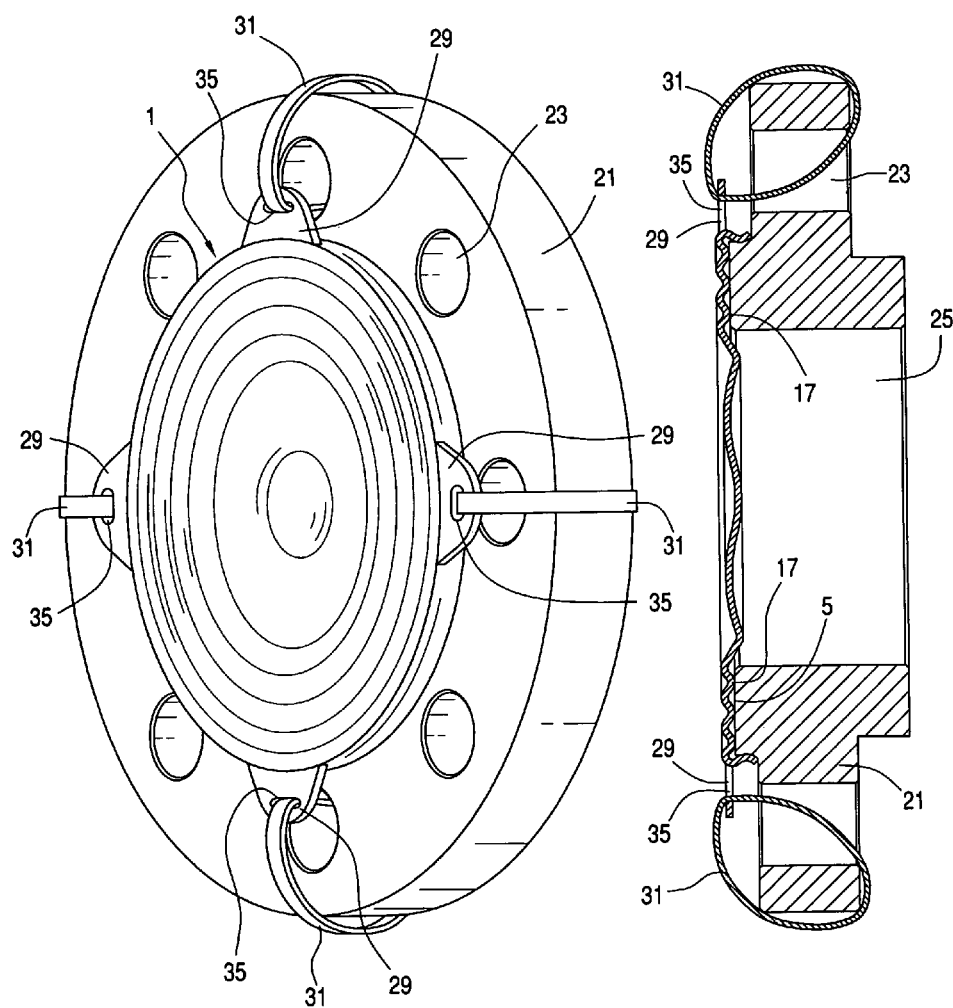
FIG. 17 is a top perspective view of another embodiment of the flange protector of the present invention installed on a flange.
FIG. 18 is a cross-sectional view of the flange protector of FIG. 17 installed on a flange.

The finger grip(s) may also be provided with hole 33 so that the flange protector may be physically tied to the flange via a bolt hole as shown in FIGS. 15 and 17. This also serves as a visual and physical reminder that the flange protector is installed on the face of the flange, to avoid two flanges being bolted together with one or more flange protectors still in place. In such an instance, plastic ties 31, for instance, may be used to tie the flange protector to the flange.

Because there are 7 classes of flanges (having different pressure ratings) for each nominal pipe size, and 21 nominal pipe sizes, a manufacturer would be required to tool 147 different parts to cover all such possibilities, which would be prohibitively expensive. Because the flange protector of the present invention is intended to cover only the raised face of the flange, whose diameter is constant across various classes, 21 different diameters of the flange protector of the present invention will instead cover all 147 possible parts of the ANSI 16.5 standard, herein incorporated by reference in its entirety.

Indeed, ANSI flange classes 400, 600, 900, 1500 and 2500 have sufficient raised face height to ensure that the flange protector of the present invention will sufficiently engage the raised flange face to remain in place (i.e., 0.25 inch height). However, in the event that the flange protector of the present invention is desired to be used with class 150 and 300 flanges having smaller heights, the flange protector of the present invention may be provided with finger tabs having holes which can be used to tie the flange protector to the flange face using corresponding bolt holes.

Desirably, in order to provide added flexibility for the skirt in relation to the cover portion, the intersection therebetween is preferably defined by bead 33 (FIGS. 6 and 13). The bead assists in maintaining the requisite force between the skirt and the flange shoulder so that the flange protector remains in place. The lateral extent of the bead is desirably outside the vertical axis of the flange shoulder to avoid creep of the skirt upwardly along the shoulder upon installation. The fact that the corner bead extends from the flange cover also provides additional protection of the edge of the flange against damage during transport or storage due to the resilience of the corner bead.

The flange protector of the present invention can be used with any suitable type of flange, such as a pipe flange or ring joint (RTJ) flange, having a highly machined or finished flange face that is in need of protection, which flange face is defined by a circumferential shoulder portion, and upon which the flange protector of the present invention can be placed. RTJ flanges have discontinuous circumferential surfaces to be protected.

In order to provide the requisite protection for the flange, the flange protector is comprised of a conventional impact resistant molding material such as polyethylene, polyurethane, polypropylene, polyvinyl chloride or similar thermoplastic or thermoset material with good impact qualities. The particular molding material employed is not critical to practice of the claimed invention, as long as the material enables the desired protection of the flange surface to be achieved. The flange protector may be formed by any suitable plastic processing method used with such materials, such as injection molding, rotational molding, compression molding, vacuum forming, etc. One of ordinary skill in the art can readily form the flange protector of the present invention using such methods using appropriate materials and processing conditions.

While the invention has been described in connection with what are presently considered to be the most desirable and appropriate embodiments, it is understood that the invention is not limited to the disclosed embodiments, but is also intended to cover within the scope and spirit of the appended claims various modifications and equivalents thereof.

What is claimed is:

1. A flange protector and masking device comprising a flexible impact-resistant material having a cover portion to cover a raised face of a flange, said raised face surface defined by a circumferential raised shoulder portion extending from a surface of said flange, said cover portion having such dimension and configured to cover in protective relationship the raised face surface of a flange, said cover portion of said flange protector extending across said raised face surface and having a skirt portion at a periphery thereof which is configured to extend downwardly from said cover portion in encompassing relationship to said shoulder portion, a surface of said skirt opposing said shoulder portion when in encompassing relationship thereto having at least one protrusion extending therefrom serving to space said skirt from said shoulder portion.

2. The flange protector of claim 1, wherein said skirt portion is comprised of downwardly extending disconnected portions.

3. The flange protector of claim 1, wherein said skirt portion extends downwardly about the entire circumference of said raised shoulder portion.

4. The flange protector of claim 1, wherein said flange protector is comprised of polyethylene, polypropylene, polyurethane, or polyvinyl chloride.

5. The flange protector of claim 1, wherein said at least one protrusion comprises a rib which extends about the circumference of said skirt.

6. The flange protector of claim 1, wherein a bottom surface of said cover portion includes at least one protrusion to space said bottom surface from said facing surface.

7. The flange protector of claim 6, wherein said at least one protrusion extends about said bottom surface.

8. The flange protector of claim 6, wherein said bottom surface includes multiple protrusions.

9. The flange protector of claim 8, wherein said multiple protrusions extend about said bottom surface.

10. The flange protector of claim 1 wherein said cover portion has a wavy configuration in portions thereof.

11. The flange protector of claim 1, further comprising a centrally-positioned indent portion which is configured to mate with a correspondingly-shaped bore in the center of a flange.

12. The flange protector of claim 1, wherein an intersection between said cover portion and said skirt is defined by a bead spaced laterally outwardly from a vertical axis of said shoulder portion.

13. In combination, a flange protector and masking device and a flange having a raised face surface, said flange protector being in protective relationship with the raised face surface of said flange, said flange protector comprising a flexible impact-resistant material having a cover portion to cover said raised face of a flange, said cover portion having such dimension and configured to cover in protective relationship the raised face surface of said flange, said raised face surface defined by a circumferential raised shoulder portion extending from a surface of said flange, said cover portion having such dimension and configured to cover in protective relationship the raised face surface of a flange, said cover portion of said flange protector extending across said raised face surface and having a skirt portion which extends downwardly along said shoulder portion; and
    wherein a surface of said skirt portion opposing said shoulder portion when in encompassing relationship thereto has at least one protrusion extending therefrom serving to space said skirt from said shoulder portion.

14. The combination of claim 13, wherein said skirt portion is comprised of downwardly extending disconnected portions.

15. The combination of claim 13, wherein said skirt portion extends downwardly about the entire circumference of said raised shoulder portion.

16. The combination of claim 13, wherein said flange protector is comprised of polyethylene, polypropylene, polyurethane, or polyvinyl chloride.

17. The combination of claim 13, wherein said at least one protrusion extends circumferentially about said skirt.

18. The combination of claim 13, wherein a bottom surface of said cover portion includes at least one protrusion to space said bottom surface from said facing surface.

19. The combination of claim 18, wherein said at least one protrusion extends about said bottom surface.

20. The combination of claim 18, wherein said bottom surface includes multiple protrusions.

21. The combination of claim 20, wherein said multiple protrusions extend circumferentially about said bottom surface.

22. The flange protector of claim 13, wherein said cover portion has a wavy configuration in portions thereof.

23. The combination of claim 13, further comprising a centrally-positioned indent portion which is configured to mate with a correspondingly-shaped bore in the center of a flange.

24. The flange protector of claim 13, wherein an intersection between said cover portion and said skirt is defined by a bead spaced laterally outwardly from a vertical axis of said shoulder portion.

25. The combination of claim 13, wherein an end of said skirt abuts a surface of said flange.

26. In combination, a flange protector and masking device and a flange having a raised face surface, said flange protector being in protective relationship with the raised face surface of said flange, said flange protector comprising a flexible impact-resistant material having a cover portion to cover said raised face of a flange, said cover portion having such dimension and configured to cover in protective relationship the raised face surface of said flange, said raised face surface defined by a circumferential raised shoulder portion extending from a surface of said flange, said cover portion having such dimension and configured to cover in protective relationship the raised face surface of a flange, said cover portion of said flange protector extending across said raised face surface and having a skirt portion which extends downwardly along said shoulder portion; and
    wherein said cover portion has a wavy configuration in portions thereof.

27. The combination of claim 26, wherein a surface of said skirt portion opposing said shoulder portion when in encompassing relationship thereto has at least one protrusion extending therefrom serving to space said skirt from said shoulder portion.

28. The combination of claim 27, wherein said at least one protrusion extends circumferentially about said skirt.

29. The combination of claim 26, wherein said skirt portion is comprised of downwardly extending disconnected portions.

30. The combination of claim 26, wherein said skirt portion extends downwardly about the entire circumference of said raised shoulder portion.

31. The combination of claim 26, wherein said flange protector is comprised of polyethylene, polypropylene, polyurethane, or polyvinyl chloride.

32. The combination of claim 26, wherein a bottom surface of said cover portion includes at least one protrusion to space said bottom surface from said facing surface.

33. The combination of claim 32, wherein said at least one protrusion extends about said bottom surface.

34. The combination of claim 32, wherein said bottom surface includes multiple protrusions.

35. The combination of claim 34, wherein said multiple protrusions extend circumferentially about said bottom surface.

36. The combination of claim 26, further comprising a centrally-positioned indent portion which is configured to mate with a correspondingly-shaped bore in the center of a flange.

37. The flange protector of claim 26, wherein an intersection between said cover portion and said skirt is defined by a bead spaced laterally outwardly from a vertical axis of said shoulder portion.

38. The combination of claim 26, wherein an end of said skirt abuts a surface of said Flange.

39. In combination, a flange protector and masking device and a flange having a raised face surface, said flange protector being in protective relationship with the raised face surface of said flange, said flange protector comprising a flexible impact-resistant material having a cover portion to cover said raised face of a flange, said cover portion having such dimension and configured to cover in protective relationship the raised face surface of said flange, said raised face surface defined by a circumferential raised shoulder portion extending from a surface of said flange, said cover portion having such dimension and configured to cover in protective relationship the raised face surface of a flange, said cover portion of said flange protector extending across said raised face surface and having a skirt portion which extends downwardly along said shoulder portion;
    further comprising a centrally-positioned indent portion which is configured to mate with a correspondingly-shaped bore in the center of a flange.

40. The combination of claim 39, wherein a surface of said skirt portion opposing said shoulder portion when in encompassing relationship thereto has at least one protrusion extending therefrom serving to space said skirt from said shoulder portion.

41. The combination of claim 40, wherein said at least one protrusion extends circumferentially about said skirt.

42. The combination of claim 39, wherein said skirt portion is comprised of downwardly extending disconnected portions.

43. The combination of claim 39, wherein said skirt portion extends downwardly about the entire circumference of said raised shoulder portion.

44. The combination of claim 39, wherein said flange protector is comprised of polyethylene, polypropylene, polyurethane, or polyvinyl chloride.

45. The combination of claim 39, wherein a bottom surface of said cover portion includes at least one protrusion to space said bottom surface from said facing surface.

46. The combination of claim 45, wherein said at least one protrusion extends about said bottom surface.

47. The combination of claim 45, wherein said bottom surface includes multiple protrusions.

48. The combination of claim 47, wherein said multiple protrusions extend circumferentially about said bottom surface.

49. The flange protector of claim 39, wherein said cover portion has a wavy configuration in portions thereof.

50. The flange protector of claim 39, wherein an intersection between said cover portion and said skirt is defined by a bead spaced laterally outwardly from a vertical axis of said shoulder portion.

51. The combination of claim 39, wherein an end of said skirt abuts a surface of said Flange.

52. In combination, a flange protector and masking device and a flange having a raised face surface, said flange protector being in protective relationship with the raised face surface of said flange, said flange protector comprising a flexible impact-resistant material having a cover portion to cover said raised face of a flange, said cover portion having such dimension and configured to cover in protective relationship the raised face surface of said flange, said raised face surface defined by a circumferential raised shoulder portion extending from a surface of said flange, said cover portion having such dimension and configured to cover in protective relationship the raised face surface of a flange, said cover portion of said flange protector extending across said raised face surface and having a skirt portion which extends downwardly along said shoulder portion;
wherein an intersection between said cover portion and said skirt is defined by a bead spaced laterally outwardly from a vertical axis of said shoulder portion.

53. The combination of claim 52, wherein a surface of said skirt portion opposing said shoulder portion when in encompassing relationship thereto has at least one protrusion extending therefrom serving to space said skirt from said shoulder portion.

54. The combination of claim 53, wherein said at least one protrusion extends circumferentially about said skirt.

55. The combination of claim 52, wherein said skirt portion is comprised of downwardly extending disconnected portions.

56. The combination of claim 52, wherein said skirt portion extends downwardly about the entire circumference of said raised shoulder portion.

57. The combination of claim 52, wherein said flange protector is comprised of polyethylene, polypropylene, polyurethane, or polyvinyl chloride.

58. The combination of claim 52, wherein a bottom surface of said cover portion includes at least one protrusion to space said bottom surface from said facing surface.

59. The combination of claim 58, wherein said at least one protrusion extends about said bottom surface.

60. The combination of claim 58, wherein said bottom surface includes multiple protrusions.

61. The combination of claim 60, wherein said multiple protrusions extend circumferentially about said bottom surface.

62. The flange protector of claim 52, wherein said cover portion has a wavy configuration in portions thereof.

63. The combination of claim 52, further comprising a centrally-positioned indent portion which is configured to mate with a correspondingly-shaped bore in the center of a flange.

64. The combination of claim 52, wherein an end of said skirt abuts a surface of said flange.

* * * * *